United States Patent Office.

JOHN A. McCLELLAND, OF LOUISVILLE, KENTUCKY.

*Letters Patent No.* 77,304, *dated April* 28, 1868; *reissue No.* 3,777, *dated December* 28, 1869.

DIVISION A.

IMPROVEMENT IN PREPARING COMPOUNDS CONTAINING COLLODION.

The Schedule referred to in these Letters Patent and making part of the same.

*To all whom it may concern:*

Be it known that I, JOHN A. McCLELLAND, of Louisville, in the county of Jefferson, and State of Kentucky, have invented a new and improved Method of Preparing Compounds Containing Collodion; and I do hereby declare that the following is a full, clear, and exact description thereof.

The nature of my invention consists in a novel mode of working a compound of collodion and gums, resins or balsams, with or without coloring-matter, whereby a solid, homogeneous, and massive substance is produced, which is capable of being moulded or wrought into various useful and ornamental objects, and to take the place of ivory, amber, horn, hard rubber, and other hard, resilient substances.

I am aware that gums and resins have been mixed with collodion, or with a semi-fluid produced by partially dissolving pyroxyline in alcohol and ether, and a compound thus produced, which was used in the manufacture of a great variety of objects.

Such a compound will be found described in an English Letters Patent numbered 2,249, of the year 1860.

I do not, therefore, desire to be understood, in the following description, as claiming, broadly, such a compound.

The following description will enable others skilled in the art to understand my improved method of treating compounds containing collodion.

I employ collodion, prepared in the usual way, by the treatment of cotton or other vegetable fibres with sulphuric and nitric acids, and well-known solvents, but although the pyroxyline is made fully soluble, the solution used need be made only of the consistency of sirup.

To the collodion is added, in solution or powder, gum-copal, shellac, or other resinous substances, in desired proportion, according to the nature and quality of the material to be produced, and the uses to which it is to be applied, taking care to thoroughly mix and incorporate the ingredients of the composition.

Metallic oxides and coloring-matters may also be added to the composition, to give greater density to it, and impart any color or shade of color desired. And, further, in order to render the material quite uninflammable, and to neutralize the combustible nature of the ingredients, there may also be mixed with the composition a small portion of phosphate of ammonia, or of magnesia, iodide of cadmium, peroxide of mercury, or the oxalate of lime.

The composition is then, after being allowed to settle and expel all the air that it may enclose, poured out upon a flat surface, and dried by a gentle heat, which may be done in a kiln in connection with a still or retort for recovering the solvents.

The residuum will then be in the form of thin sheets or plates.

These dried sheets or plates of the composition are reduced, by cutting, grinding, or otherwise, to fine particles, in which state the composition is ready for being worked into a massive solid material, to form a variety of useful objects, such, for example, as beads, buttons, mouth-pieces for pipes, handles of knives, canes, and umbrellas, door-knobs, billiard-balls, keys of piano-fortes, &c.

The distinguishing feature of the invention, which is the subject of this division A, is the comminution or reduction of the dried sheets or plates of collodion and its compounds, prepared substantially as above described, and the subsequent working and welding of it into a solid, massive, homogeneous material in moulds.

This is accomplished by a slight saturation of the powdered compound, by treating it with ether and alcohol or other suitable solvents, to render the particles adhesive, soft, and plastic, in which condition the material is placed in suitable moulds and subjected to pressure, and then cured or dried by the application of a moderate degree of heat, commencing at about 100° Fahrenheit, and gradually increasing the heat, in twenty-four hours or more, to a temperature of about 150°, in order to thoroughly evaporate and dispel all traces of the solvents, and leave the material dry and solid.

In its massive form, the material, prepared as above described, may be worked into various useful and beautiful forms by cutting-tools, after which the surfaces may be handsomely polished.

By my invention, I furnish the compound for use by the artisan, either in the form of sheets, plates, or pieces of different thicknesses, to be by him reduced to the proper degree of fineness for being treated with its solvents, and thus rendered plastic, or I furnish the material in a ground state, ready for being treated with its solvents.

Having described my invention,

What I claim as new, and desire to secure by Letters Patent, is—

1. The method of redissolving and working collodion and its compounds, prepared substantially as described.

2. Collodion and its compounds, dried and reduced to a granular or powdered state preparatory to being treated with the proper solvents, substantially as described.

J. A. McCLELLAND.

Witnesses:
WM. M. BRIDGES,
C. M. WRIGHT.